(12) United States Patent
Hergenrother et al.

(10) Patent No.: US 7,201,944 B2
(45) Date of Patent: *Apr. 10, 2007

(54) RUBBER COMPOSITIONS AND ARTICLES THEREOF HAVING IMPROVED METAL ADHESION AND METAL ADHESION RETENTION WITH BRIGHT STEEL

(75) Inventors: William L. Hergenrother, Akron, OH (US); Steven E. Schonfeld, Akron, OH (US); Frederick J. Ravagnani, deceased, late of Uniontown, OH (US); by Roberta A. Ravagnani, legal representative, Akron, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/323,458

(22) Filed: Dec. 18, 2002

(65) Prior Publication Data

US 2004/0122180 A1   Jun. 24, 2004

(51) Int. Cl.
  *B32B 15/02*  (2006.01)
  *B32B 15/06*  (2006.01)
  *B32B 15/18*  (2006.01)

(52) U.S. Cl. ............ 427/334; 252/511; 427/327; 428/450; 428/461; 524/262; 524/265; 524/492; 524/502; 524/515; 524/528

(58) Field of Classification Search ............. 427/334, 427/327; 524/262, 265, 492, 502, 515, 528; 252/511; 428/450, 461
See application file for complete search history.

(56) References Cited

U.S. PATENT DOCUMENTS

| | | | |
|---|---|---|---|
| 4,052,524 A | 10/1977 | Harakas et al. | 428/383 |
| 4,441,946 A | 4/1984 | Sharma | 156/307.3 |
| 4,474,908 A * | 10/1984 | Wagner | |
| 5,126,501 A | 6/1992 | Ellul | |
| 5,882,799 A | 3/1999 | Roseboom et al. | 428/461 |
| 6,465,544 B1 * | 10/2002 | Bomal et al. | 523/213 |
| 2003/0221760 A1 | 12/2003 | Grimberg et al. | |

FOREIGN PATENT DOCUMENTS

| | | |
|---|---|---|
| EP | 0 141 133 A1 | 5/1985 |
| EP | 0 953 593 A1 | 4/1999 |
| EP | 1002835 A2 | 5/2000 |
| EP | 1293529 A2 | 3/2003 |
| WO | WO 96/37547 * | 11/1996 |
| WO | WO 00/39356 A1 | 12/1999 |
| WO | WO 00/63462 A1 | 4/2000 |
| WO | PCT WO 01/96463 A2 | 12/2001 |
| WO | PCT WO 01/196462 A2 | 12/2001 |

OTHER PUBLICATIONS

W.J. van Ooij & S.K. Jayaseelan, *New Developments in Rubber-Steel Bonding Processes*, Presented at a Meeting of the Rubber Division, American Chemical Society, Oct. 17-20, 2000, Paper No. 5, pp. 1-16 w/ drawings.
PCT/US03/9956 Search Report .

* cited by examiner

Primary Examiner—Ana Woodward
(74) Attorney, Agent, or Firm—Dave Burleson; Meredith Palmer

(57) ABSTRACT

A vulcanizable rubber composition having improved metal adhesion and metal adhesion retention properties with bright steel, the improvement wherein from about 0.1 to about 10 parts by weight of a compound selected from the group consisting of aminosilanes and mercaptosilanes and mixtures thereof, per 100 parts of the rubber component in the rubber composition is incorporated into the rubber composition prior to curing. Structural components for a pneumatic tire contain a cured rubber composition, having from about 0.1 to about 10 parts by weight of a compound selected from the group consisting of aminosilanes and mercaptosilanes and mixtures thereof per 100 parts of the rubber component in the rubber composition, incorporated into the rubber compounds prior to curing. A method for improving metal adhesion and metal adhesion retention properties between a vulcanizable rubber composition and bright steel comprises the step of incorporating from about 0.1 to about 10 parts by weight of a compound selected from the group consisting of aminosilanes and mercaptosilanes and mixtures thereof per 100 parts of the rubber component in the rubber composition into the rubber composition prior to curing.

20 Claims, No Drawings

RUBBER COMPOSITIONS AND ARTICLES THEREOF HAVING IMPROVED METAL ADHESION AND METAL ADHESION RETENTION WITH BRIGHT STEEL

BACKGROUND OF THE INVENTION

The present invention is directed toward improving the adhesion and adhesion retention between a rubber composition and metallic reinforcement cord, such as steel wire and cable which is embedded in the rubber stock. Flat sheets or strips of such stocks, reinforced with metal or fibers, are utilized as plies or other components in the manufacture of tires, repair stocks for retreading tires, conveyor belts, hoses and the like and are referred to in the art as rubber skim stocks. Skim refers to a relatively thin layer or coating of the rubber over the reinforcement filaments or cords. Greater thicknesses of rubber are also bonded to metal in other instances such as motor mounts and golf club shafts and these would not be termed skim stocks.

In the manufacture of the foregoing rubber articles, particularly steel-belted bias and radial tires, it has become common to reinforce the rubber skim stock material with steel wire or cable. One of the more important uses for a metallic reinforced rubber is as a belt where one or more of these belts are substantially circumferentially oriented beneath the tread stock to maintain the integrity and shape of the tire during inflation and subsequent load. Other areas where metal reinforced rubber skim stock may be utilized is in the body ply, bead or chafer of a tire.

There are many well-known methods for promoting adhesion between vulcanizable rubber arid steel reinforcement cords. For instance, steel reinforcement cords are commonly plated with compositions that are designed to promote and maintain adhesion to vulcanized rubber. However, during construction of a tire, plated steel reinforcement cords are typically cut to fixed lengths, and the cutting process leaves a bright steel core exposed at the cross sections where cutting has occurred. As a result, the exposed bright steel core lacks the surface coating and therefore will not adhere to the vulcanized rubber of die tire, which could diminish tire performance. There is, therefore, a need for a method that promotes adhesion between a bright steel surface and vulcanized rubber.

In order to promote adhesion between rubber and ferrous metals it is known to employ a variety of metallic salts or complexes or other additives as coatings to the metal or as an ingredient in a rubber composition.

Thus, while others have sought to enhance adhesion between rubber compositions and bright steel by employing materials such as cobalt para-aminobenzoate and para-aminobenzoic acid in the stock, the art of which we are aware has not disclosed the exclusive use of the silane compounds set forth hereinbelow in a vulcanizable rubber stock to increase adhesion properties between rubber and metallic reinforcement, particularly bright steel.

SUMMARY OF THE INVENTION

The present invention provides a vulcanizable rubber composition having improved metal adhesion and metal adhesion retention properties with bright steel, the improvement wherein from about 0.1 to about 10 parts by weight of a compound selected from the group consisting of aminosilanes and mercaptosilanes and mixtures thereof per 100 parts of the rubber component in the rubber composition is incorporated into the rubber composition prior to curing.

The present invention also provides a structural component for a pneumatic tire containing a cured rubber composition having improved metal adhesion and metal adhesion retention properties with bright steel, the improvement wherein from about 0.1 to about 10 parts by weight of a compound selected from the group consisting of aminosilanes and mercaptosilanes and mixtures thereof per 100 parts of the rubber component in the rubber composition is incorporated into the rubber composition prior to curing.

Finally, a method for improving metal adhesion and metal adhesion retention properties between a vulcanizable rubber composition and bright steel is provided comprising the step of incorporating from about 0.1 to about 10 parts by weight of a compound selected from the group consisting of aminosilanes and mercaptosilanes and mixtures thereof per 100 parts of the rubber component in the rubber composition into the rubber composition prior to curing.

DETAILED DESCRIPTION OF THE ILLUSTRATED EMBODIMENTS

To illustrate our invention, a typical example of a rubber component with metallic reinforcement embedded therein was chosen. In particular, the example used to demonstrate the invention was a rubber skim stock which is suitable for the preparation of rubber articles such as tires. Adhesion between this stock with steel reinforcement subsequent to vulcanization was measured and has also been presented hereinbelow.

Both synthetic and natural rubber may be employed within the vulcanizable rubber compositions of the present invention. These rubbers, which may also be referred to as elastomers, include, without limitation, natural or synthetic poly(isoprene) with natural polyisoprene being preferred, and elastomeric diene polymers including polybutadiene and copolymers of conjugated diene monomers with at least one monoolefin monomer. Suitable polybutadiene rubber is elastomeric and has a 1,2-vinyl content of about 1 to 3 percent and a cis-1,4 content of about 96 to 98 percent. Other butadiene rubbers, having up to about 12 percent 1,2-content, may also be suitable with appropriate adjustments in the level of other components, and thus, substantially any high vinyl, elastomeric polybutadiene can be employed. The copolymers may be derived from conjugated dienes such as 1,3-butadiene, 2-methyl-1,3-butadiene-(isoprene), 2,3-dimethyl-1,2-butadiene, 1,3-pentadiene, 1,3-hexadiene and the like, as well as mixtures of the foregoing dienes. The preferred conjugated diene is 1,3-butadiene.

Regarding the monoolefinic monomers, there include vinyl aromatic monomers such as styrene, alpha-methyl styrene, vinyl naphthalene, vinyl pyridine and the like as well as mixtures of the foregoing. The copolymers may contain up to 50 percent by weight of the monoolefin based upon total weight of copolymer. The preferred copolymer is a copolymer of a conjugated diene, especially butadiene, and a vinyl aromatic hydrocarbon, especially styrene. Preferably, the rubber compound can comprise up to about 35 percent by weight styrene-butadiene random copolymer, preferably 15 to 25 percent by weight.

The above-described copolymers of conjugated dienes and their method of preparation are well known in the rubber and polymer arts. Many of the polymers and copolymers are commercially available. It is to be understood that practice of the present invention is not to be limited to any particular rubber included hereinabove or excluded.

The rubber polymers used in practice of the present invention can comprise either 100 parts by weight of natural rubber, 100 parts by weight of a synthetic rubber or blends of synthetic rubber or blends of natural and synthetic rubber such as 75 parts by weight of natural rubber and 25 parts by weight of polybutadiene. Polymer type, however is not deemed to be a limitation to the practice of the instant invention.

The vulcanizable rubber compounds of the present invention contain conventional filler materials. Typical filler materials include reinforcing fillers normally used in rubber formulations such as carbon blacks, talcs, silica and other finely divided mineral materials. Carbon black and silica are particularly preferred. Silica and other filler materials excluding carbon black are optionally compounded with elastomers in amounts ranging from 0 to about 80 parts by weight, per 100 parts of rubber (phr).

Generally, the elastomers are compounded with carbon black in amounts ranging from about 5 to about 100 parts by weight, per 100 parts of rubber (phr), with about 5 to about 80 phr being preferred and from about 40 to about 70 phr being more preferred. Mixtures of fillers including carbon black can be employed in the foregoing amounts. The carbon blacks may include any of the commonly available, commercially-produced carbon blacks but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethylammonium bromide (CTAB) technique.

Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

Carbon Blacks

| ASTM Designation (D-1765-82a) | Surface Area ($m^2/g$) (D-3765) |
|---|---|
| N-110 | 126 |
| N-220 | 111 |
| N-339 | 95 |
| N-330 | 83 |
| N-343 | 90 |
| N-550 | 42 |
| N-660 | 35 |

The vulcanizable rubber compounds are cured by sulfur and thus, a sulfur curing agent, such as sulfur or a sulfur donor is required. Minimally, at least about 2 phr of sulfur, or an equivalent amount of sulfur donor, is added to the compound to provide high modulus. In the present invention, addition of a sulfur in oil blend is generally preferred, with the mixture comprising about 80 percent by weight of sulfur and 20 percent by weight of oil. The oils employed are conventional rubber processing oils. Conventional cure accelerators are also employed to provide fast modulus generation during cure. The vulcanizable rubber compounds also include from about 1 to 3 phr of an antioxidant and an antiozonant of conventional types, (employed in the usual amounts) to impart good heat resistance.

The compounds of the present invention can contain conventional antioxidants, antiozonants and accelerators, as is shown in the exemplary formulations which follow. It is to be understood that such components are well known to those skilled in the art and thus, the present invention is not limited to the use of any particular antioxidants, antiozonants or accelerators, or amounts thereof. Similarly, practice of the present invention is also not limited to the specific formulations presented hereinbelow.

The additive component utilized in the practice of the present invention includes silane compounds such as the aminosilanes (3-aminoalkyl triethoxy silane, where the alkyl is C2 to C8) and the mercaptosilanes 3-mercantopropyl triethoxy silane) as well as mixtures thereof. The amino groups can be 1°, 2° or 3° and include alkyl aminos having up to about eight carbon atoms. Both silane compounds can be obtained from 3-chloropropyl trichloro silane.

The silane compounds can be incorporated into the rubber skim stock in amounts ranging from about 0.1 to about 10 parts by weight per hundred parts of rubber (phr). Preferably, silane compounds are incorporated into the rubber skim stock in amounts ranging from about 0.5 to about 5 phr.

Silane compounds can be compounded into the rubber composition by using conventional techniques such as banbury batch processing, single or twin screw extrusion, continuous mixing, co-kneader extrusion, and mill mixing. Of these techniques, banbury batch processing is preferably employed.

Any conventional steel can be employed in practicing the present invention; nonlimiting examples include low, medium, and high-carbon grades of steel. Low carbon steel is preferably employed in practicing the present invention.

In the tests which follow, four rubber skim stock masterbatches, A–D, were prepared which did not contain the adhesion promotion silane compounds of the present invention. Masterbatch A contained resorcinol as an adhesion promoter. Masterbatch B contained no adhesion promoting components. Masterbatch C contained hydrocarbon resin and Manobond C as adhesion promoters. Masterbatch D contained resorcinol, hydrocarbon resin and Manobond C as adhesion promoters. Manobond C is a cobalt and boron containing additive commercially available from Rhein Chemie Corp., Trenton, N.J. Improved adhesion in a natural rubber stock containing Manobond C has been demonstrated in U.S. Pat. No. 4,267,079. The formulations of Masterbatches A–D are presented in Table 1 with all parts given on the basis of parts per hundred parts of rubber (phr) by weight.

TABLE II

Skim Stock Masterbatches

| | A | B | C | D |
|---|---|---|---|---|
| Natural Rubber | 100 | 100 | 100 | 75 |
| Polybutadiene | — | — | — | 25 |
| Carbon black | 50 | 50 | 55 | 40 |
| Silica | — | — | — | 10 |
| Zinc Oxide | 7.5 | 7.5 | 7.5 | 4.0 |
| Stearic Acid | 0.5 | 0.5 | 0.5 | 1.0 |
| Santoflex DD[a] | 2.0 | 2.0 | 2.0 | — |
| Aromatic oil | — | — | 2.0 | — |
| Santoflex 13[b] | 1.0 | 1.0 | 1.0 | 1.0 |
| Resorcinol | 2.0 | — | — | 2.5 |
| Hydrocarbon resin[c] | — | — | 2.0 | 5.0 |

TABLE II-continued

Skim Stock Masterbatches

|  | A | B | C | D |
|---|---|---|---|---|
| Manobond C | — | — | 2.0 | 3.5 |
| TOTAL | 163 | 161 | 171 | 167 |

[a] 6-dodecyl-1,2-dihydro-2,2,4-trimethyl quinoline
[b] N-(1,3-dimethylbutyl)-N'-phenyl-p-phenylenediamine
[c] Petroleum derived aliphatic hydrocarbon resin Each masterbatch was thereafter fully compounded with cure packages and the adhesion promoting silane compounds of the present invention. Masterbatch A was utilized to formulate Example Nos. 1–4. Example Nos. 1 and 2 contained, respectively, 0.5 and 2 phr of aminosilane (3-aminopropyl triethoxy silane), while Example Nos. 3 and 4 contained, respectively, 0.5 and 2 phr of mercaptosilane (3-mercaptopropyl triethoxy silane). Masterbatch B was utilized to formulate Example Nos. 5–8. Example Nos. 5 and 6 contained, respectively, 0.5 and 2 phr of aminosilane, while Example Nos. 7 and 8 contained, respectively, 0.5 and 2 phr of mercaptosilane. Masterbatch C was utilized to formulate Example Nos. 9–12. Example Nos. 9 and 10 contained, respectively, 0.5 and 2 phr of aminosilane, while Examples 11 and 12 contained, respectively, 0.5 and 2 phr of mercaptosilane. Masterbatch D was utilized to formulate Example Nos. 13–16. Example Nos. 13 and 14 contained, respectively, 0.5 and 2 phr of aminosilane, while Example Nos. 15 and 16 contained, respectively, 0.5 and 2 phr of mercaptosilane.

It is to be understood that the foregoing formulations of the masterbatches, A–D, and subsequent rubber skim stocks have been presently solely to enable those skilled in the art to evaluate practice of the invention. As such, the present invention is not to be limited only to these specific formulations.

that are plated or unplated and which have been cut to fixed lengths. Where the steel reinforcement cords are unplated, i.e., bright steel, the vulcanized rubber composition containing silane compounds adheres to the entire surface area of the reinforcement cord. Where the steel reinforcement cords comprise plated steel, bright steel surfaces may be found at each of the cord ends at the cross section where the cords were cut. And vulcanized rubber compositions containing silane compounds will adhere to these bright steel surfaces.

A nonlimiting exemplary method for preparing the vulcanizable rubber compositions was performed. A typical skim formulation used for belt reinforcement of tires was mixed on an 1.1 L Banbury mixer. Mix times were about seven minutes with a final Banbury temperature of 325° F. (163° C.). The stocks mixed in this manner were final milled at a temperature below 220° F. (104° C). At this time, the silane adhesion promoters were added to the skim stock. Formulations are provided in Tables III and IV.

TABLE III

Final Mill Mix-Masterbatches A and B

|  | 1 | 2 | 3 | 4 | 5 | 6 | 7 | 8 |
|---|---|---|---|---|---|---|---|---|
| Masterbatch A | 163 | 163 | 163 | 163 | 0 | 0 | 0 | 0 |
| Masterbatch B | 0 | 0 | 0 | 0 | 161 | 161 | 161 | 161 |
| Sulfur (80%) in Oil | 3.5 | 3.5 | 3.5 | 3.5 | 3.5 | 3.5 | 3.5 | 3.5 |
| Pre-vulcanization Inhibitor | 0.3 | 0.3 | 0.3 | 0.3 | 0.3 | 0.3 | 0.3 | 0.3 |
| Accelerator | 0.9 | 0.9 | 0.9 | 0.9 | 0.9 | 0.9 | 0.9 | 0.9 |
| HMTA/SA[a] | 2.2 | 2.2 | 2.2 | 2.2 | 0 | 0 | 0 | 0 |
| Resotropin[b] | 0 | 0 | 0 | 0 | 2.2 | 2.2 | 2.2 | 2.2 |
| Aminosilane | 0.5 | 2.0 | 0 | 0 | 0.5 | 2.0 | 0 | 0 |
| Mercaptosilane | 0 | 0 | 0.5 | 2.0 | 0 | 0 | 0.5 | 2.0 |
| TOTAL | 170.4 | 171.9 | 170.4 | 171.9 | 168.4 | 169.9 | 168.4 | 169.9 |

[a] hexamethylene tetraamine/stearic acid (95/5)
[b] resorcinol hexamethylene tetraamine

TABLE IV

Final Mill Mix-Masterbatches C and D

|  | 9 | 10 | 11 | 12 | 13 | 14 | 15 | 16 |
|---|---|---|---|---|---|---|---|---|
| Masterbatch C | 171 | 171 | 171 | 171 | — | — | — | — |
| Masterbatch D | — | — | — | — | 167 | 167 | 167 | 167 |
| Sulfur (80%) in Oil | 7.5 | 7.5 | 7.5 | 7.5 | 6.0 | 6.0 | 6.0 | 6.0 |
| Pre-vulcanization Inhibitor | 0.4 | 0.4 | 0.4 | 0.4 | — | — | — | — |
| Accelerator | 0.6 | 0.6 | 0.6 | 0.6 | — | — | — | — |
| Antioxidant | 1.0 | 1.0 | 1.0 | 1.0 | — | — | — | — |
| RFR[a] | — | — | — | — | 4.0 | 4.0 | 4.0 | 4.0 |
| TBBS[b] | — | — | — | — | 0.35 | 0.35 | 0.35 | 0.35 |
| Aminosilane | 0.5 | 2.0 | 0 | 0 | 0.5 | 2.0 | 0 | 0 |
| Mercaptosilane | 0 | 0 | 0.5 | 2.0 | 0 | 0 | 0.5 | 2.0 |
| TOTAL | 181.0 | 182.5 | 181.0 | 182.5 | 177.85 | 179.35 | 177.85 | 179.35 |

[a] resorcinol formaldehyde resin
[b] t-butyl benzothiozole sulfeneaminde

The 16 compositions were each used to build T-adhesion pads with bright steel. Steel cord style is not a limitation to the present invention and, therefore, other styles of steel cord are applicable.

A preferred embodiment for practicing the present invention is in a tire design that employs steel reinforcement cords The tests utilized T-adhesion pads prepared by placing 60 gauge (1.5 mm) slabs of uncured fully compounded rubber skim stock on 51 gauge (1.3 mm) fabric reinforced rubber backing. Commercial bright steel wire was placed between two pads of the reinforced rubber skim stock with the wires in contact with the uncured rubber skim at 1.25 cm intervals.

The width of each adhesion pad was 1.25 cm. The pads were placed in a preheated curing mold and were cured for 30 minutes at 149° C. Rubber-steel cord adhesion testing was done on a Model 1130 Instron Universal Tester at a crosshead speed of 25.4 cm per minute and 110° C. The T-adhesion pads were preheated in the 110° C. oven for 20 minutes prior to testing. The test procedure was as follows.

Detailed T-Adhesion Test Procedure

1. Using a Clicker machine and a 15.24×1.25 cm die, prepare an adequate number of calendared and control stock samples for T-adhesion pad building.
2. Use one piece of calendared fabric reinforced rubber backing (0.1295 cm).
3. Ply one piece of 60 gauge (1.5 mm) control rubber skim stock onto the fabric backing.
4. Place sample in building jig with fabric side down.
5. Place ten cords (of brass or zinc coated wire) on the sample in the jig.
6. Invert another 2 ply assembly, made as in items 1, 2 and 3, on top of cords so that cords are between the 2 layers of rubber skim stock to be tested.
7. This assembly should now fit snugly into the cavity of the curing mold.
8. Adhesion pads shall be cured for 30 minutes at 149° C. and then allowed to equilibrate for 24 hours before testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottom to permit the sample to be inserted with the wires protruding. The bottom grip should be a wedge type, designed to exert increasing tightening as each wire is pulled from the cured sample.
12. Record 10 wire pull-outs and calculate the average.

All testing of the skim stocks was done in T-adhesion pads prepared by placing 60 gauge (1.5 mm) slabs of uncured skim stock on 50 gauge (1.3 mm) fiber reinforced backing. Sample width was one half inch (1.25 cm). Clean wires were placed between two pads of the reinforced skim stocks with the wires in contact with the uncured skim and spaced at one half inch (1.25 cm) intervals. The pads were placed in a mold and cured for 30 minutes at 300° F. (149° C.). The pads were then steam bomb aged for one hour at 300° F. (149° C.). The testing of these pads was done on an Instron Universal tester at ten inches (25.4 cm) at 230° F. (110° C.).

Several tests were conducted on each of the 16 stocks for comparison. Table V and VI show the results of the testing under normal (unaged) conditions in a steam bomb at 90 percent relative humidity at 95° F. (30° C.) for 60 to 180 days and in a humidity chamber for 7 days. Humidity chamber aging is significant for determining the chemical stability of chemical bonds formed between the rubber stock and the metallic reinforcement when exposed to conditions of high relative humidity and high temperature, as compared to ambient, and extended periods of time. The force necessary to pull or remove the metallic reinforcement from the vulcanized rubber skim stock is given first, in kilograms/cm, followed by the percent of rubber skim stock remaining on the surface of the metallic reinforcement. The amount of rubber skim stock remaining on the metallic reinforcement was determined by visual examination and has been reported as % rubber coverage.

TABLE V

| | Physical Properties | | | | | | | |
|---|---|---|---|---|---|---|---|---|
| Example Nos. | 1 | 2 | 3 | 4 | 5 | 6 | 7 | 8 |
| Monsanto Rheometer 300° F. (149° C.) | | | | | | | | |
| TS(2)[a] (minutes) | 5.4 | 2.7 | 3.2 | 1.6 | 5.1 | 2.7 | 3.9 | 1.9 |
| TC(90)[b] (minutes) | 17.4 | 15.0 | 15.1 | 13.8 | 16.2 | 15.5 | 15.3 | 15.2 |
| IP(L)[c] | 9.5 | 12.9 | 8.8 | 10.1 | 8.8 | 12.3 | 8.9 | 10.1 |
| IP(90)[d] | 46.3 | 47.3 | 44.4 | 45.1 | 45.7 | 47.4 | 46.0 | 47.0 |
| IP(100)[e] | 50.4 | 51.3 | 48.4 | 49.0 | 49.8 | 51.3 | 50.1 | 51.1 |
| CRI[f] | 8.3 | 8.1 | 8.4 | 8.2 | 9.0 | 7.8 | 8.8 | 7.5 |
| Ring Tensile - 23' Cure | | | | | | | | |
| 300% Mod (MPa) | 22.43 | — | 21.25 | 21.39 | 20.42 | — | 19.46 | 19.80 |
| Tensile Strength (MPa) | 22.56 | 19.94 | 21.25 | 21.39 | 20.42 | 18.29 | 20.01 | 20.84 |
| Elongation (%) | 310 | 270 | 300 | 300 | 300 | 260 | 310 | 320 |
| T-Adhesion to steel cord (Unconditioned) (Kg/cm) | 12.5 (0) | 12.9 (0) | 14.3 (0) | 16.8 (0) | 11.1 (0) | 8.9 (0) | 14.3 (10) | 15.0 (10) |
| T-Adhesion to steel cord (Steam Bomb) (Kg/cm) | 21.4 (10) | 21.1 (10) | 21.1 (10) | 24.6 (20) | 15.7 (0) | 14.6 (0) | 15.4 (0) | 18.9 (10) |
| T-Adhesion steel cord (Unconditioned) (Kg/cm) | 5.0 (0) | 5.7 (0) | 4.3 (0) | 6.4 (0) | 4.6 (0) | 5.0 (0) | 5.0 (0) | 9.6 (0) |
| T-Adhesion steel cord (Steam Bomb) (Kg/cm) | 13.6 (0) | 12.9 (0) | 9.3 (0) | 14.3 (0) | 8.6 (0) | 8.2 (0) | 8.9 (0) | 10.7 (0) |
| Humidity Chamber - Green Adhesion (Weight 15 lbs) (6.8 kg) | | | | | | | | |
| 7 days | | | | | | | | 50.3 (90) | 42.5 (90) |
| Humidity Chamber - Green Adhesion (Weight 15 lbs) (6.8 kg) | | | | | | | | |
| 14 days | | | | | | | | 20.4 | 43.2 |

[a]time to scorch
[b]time to cure 90%
[c]minimum torque

TABLE V-continued

Physical Properties

| Example Nos. | 1 | 2 | 3 | 4 | 5 | 6 | 7 | 8 |
|---|---|---|---|---|---|---|---|---|

[d] 90% of maximum torque
[e] maximum torque
[f] cure rate index

TABLE VI

Physical Properties

| Example Nos. | 9 | 10 | 11 | 12 | 13 | 14 | 15 | 16 |
|---|---|---|---|---|---|---|---|---|
| Monosanto Rheometer 300° F. (149° C.) | | | | | | | | |
| TS(2)[a] | 5.7 | 2.7 | 4.7 | 2.0 | 6.7 | 4.7 | 3.6 | 3.2 |
| TC(90)[b] | 17.3 | 18.8 | 15.0 | 15.3 | 18.0 | 13.0 | 12.0 | 11.8 |
| IP(2)[c] | 7.3 | 8.3 | 7.9 | 9.8 | 7.0 | 8.8 | 7.9 | 9.7 |
| IP(90)[d] | 42.2 | 47.7 | 37.5 | 38.6 | 37.5 | 42.1 | 40.4 | 40.2 |
| IP(100)[e] | 46.1 | 52.1 | 40.8 | 41.8 | 40.9 | 45.8 | 44.0 | 43.6 |
| CRI[f] | 8.6 | 6.2 | 9.7 | 7.5 | 3.7 | 4.2 | 3.8 | 3.6 |
| Ring Tensile - 23' Cure | | | | | | | | |
| 300% Mod (MPa) | 15.23 | 18.98 | 13.11 | 13.52 | 12.21 | 14.15 | 12.01 | 12.63 |
| Tensile Strength (MPa) | 18.70 | 19.46 | 16.84 | 17.46 | 16.49 | 17.73 | 16.15 | 18.63 |
| Elongation (%) | 350 | 330 | 370 | 360 | 380 | 370 | 370 | 400 |
| T-Adhesion to steel cord (Unconditioned) (Kg/cm) | 13.9 (0) | 6.4 (0) | 16.8 (10) | 6.4 (0) | 27.5 (60) | 21.2 (20) | 32.9 (80) | 29.3 (69) |
| T-Adhesion to steel cord (Steam Bomb) (Kg/cm) | 11.8 (0) | 8.9 (0) | 16.8 (0) | 8.6 (0) | 24.6 (30) | 23.2 (20) | 27.5 (50) | 35.0 (70) |
| T-Adhesion to steel cord (Unconditioned) (Kg/cm) | 2.9 (0) | 2.9 (0) | 3.9 (0) | 3.2 (0) | 6.4 (0) | 4.6 (0) | 8.9 (0) | 5.0 (0) |
| T-Adhesion to steel cord (Steam Bomb) (Kg/cm) | 4.2 (0) | 2.9 (0) | 3.9 (0) | 2.1 (0) | 7.9 (0) | 6.4 (0) | 8.9 (0) | 9.6 (0) |
| Humidity Chamber - Green Adhesion (Weight 15 lbs) (6.8 kg) | | | | | | | | |
| 7 Days | 32.5 (80) | 45.4 (80) | 42.1 (80) | 31.1 (90) | 58.9 (100) | 49.7 (90) | 26.8 (80) | 55.0 (100) |

[a] time to scorch
[b] time to cure 90%
[c] minimum torque
[d] 90% of maximum torque
[e] maximum torque
[f] cure rate index Typical properties for a reinforcing belt skim would include Shore A values of over 55, 300 percent modulus values of at least 6.9 MPa and elongations at break of at least 250 percent. With reference to the physical properties reported in Tables V and VI, all of the Examples showed 300 percent modulus and elongation exceeding these values. T-adhesion values between rubber and bright steel (unaged) were acceptable inasmuch as any adhesion is an improvement over conventional stocks without the adhesion promoting additives of the present invention, where little to no adhesion is obtained. Steam bomb values were good and humidity chamber aging values were very good.

In light of the foregoing, it should thus be evident that the addition of certain silane compounds into vulcanizable rubber compounds promotes adhesion between the rubber compounds and bright steel. The known uses of such rubber compounds include belt skims for belted tires, repair socks for retreading of steel belts where bright steel wire is exposed, and to enclose the bare steel ends of cut wire belts. Other uses are evident in any application where rubber would be bonded to unplated bright steel surfaces. This could include golf club grips, motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

In conclusion, it is to be understood that all methods and rubber compounds disclosed herein fall within the scope of the claimed invention and that the subject invention is not to be limited by the examples set forth herein. As will be apparent to those skilled in the art, the formulations of the rubber composition can be varied within the scope of the total specification disclosure by selection of various amounts of the silane compounds of the present invention and by substitution of various components for any of the other, non-inventive components of the rubber composition as well as the amounts thereof. While, in accordance with the patent statutes, only the preferred embodiments of the scope of the present invention have been described in detail hereinabove, the present invention is not to be limited thereby. Rather, the scope of the invention shall include all modifications and variations that fall within the scope of the attached claims.

The invention claimed is:

1. A method for adhering steel reinforcement to rubber, comprising:
   a) providing a blended composition from ingredients that comprise (1) at least one rubber,
(2) carbon black particulate filler selected from one or more of furnace blacks, channel blacks, lamp blacks, and acetylene blacks,
(3) a sulfur curing agent, and
(4) a silane component comprising at least one of an aminosilane and a mercaptosilane,
said composition being free of metallic salts and complexes;
b) forming a layer of rubber stock from said blended composition; and
c) incorporating steel reinforcement into said rubber stock to provide a reinforced composite, said steel reinforcement having at least some of its surface area being untreated, wherein said silane component acts to adhere said at least one rubber to said steel reinforcement in at least the untreated surface area.

2. The method of claim 1 wherein said blended composition is provided from ingredients that comprise, per 100 parts of said at least one rubber, from 0.1 to about 10 parts by weight of said silane component.

3. The method of claim 2 wherein said blended composition is provided from ingredients that comprise, per 100 parts of said at least one rubber, from 0.5 to about 5 parts by weight of said silane component.

4. The method of claim 1 wherein said blended composition is provided from ingredients that comprise, per 100 parts of said at least one rubber, up to about 2 parts by weight of said silane component.

5. The method of claim 1 wherein said blended composition is provided from ingredients that comprise, per 100 parts of said at least one rubber, from about 5 to about 100 parts by weight of said carbon black.

6. The method of claim 5 wherein said particulate filler component comprises at least one additional filler and wherein said blended composition is provided from ingredients that comprise, per 100 parts of said at least one rubber, up to about 80 parts by weight of said at least one additional filler.

7. The method of claim 1 wherein said steel reinforcement is in the form of at least one of wire, cable, cord, and filament.

8. The method of claim 1 wherein said silane component is added to said blended composition after the other ingredients have been mixed.

9. The method of claim 1 wherein said steel reinforcement comprises low carbon steel.

10. The method of claim 1 further comprising curing said reinforced composite so as to provide a vulcanized rubber article.

11. A method for adhering steel reinforcement to rubber, comprising:
a) providing a blended composition from ingredients that comprise
(1) at least one rubber,
(2) carbon black particulate filler selected from one or more of furnace blacks, channel blacks, lamp blacks, and acetylene blacks,
(3) a sulfur curing agent, and
(4) a silane component comprising at least one of an aminosilane and a mercaptosilane,
said composition being free of cobalt salts and complexes;
b) forming a layer of rubber stock from said blended composition; and
c) incorporating steel reinforcement into said rubber stock to provide a reinforced composite, said steel reinforcement having at least some of its surface area being untreated, wherein said silane component acts to adhere said at least one rubber to said steel reinforcement in at least the untreated surface area.

12. The method of claim 11 wherein said blended composition is provided from ingredients that comprise, per 100 parts of said at least one rubber, from 0.1 to about 10 parts by weight of said silane component.

13. The method of claim 12 wherein said blended composition is provided from ingredients that comprise, per 100 parts of said at least one rubber, from 0.5 to about 5 parts by weight of said silane component.

14. The method of claim 11 wherein said blended composition is provided from ingredients that comprise, per 100 parts of said at least one rubber, up to about 2 parts by weight of said silane component.

15. The method of claim 11 wherein said blended composition is provided from ingredients that comprise, per 100 parts of said at least one rubber, from about 5 to about 100 parts by weight of said carbon black.

16. The method of claim 15 wherein said particulate filler component comprises at least one additional filler and wherein said blended composition is provided from ingredients that comprise, per 100 parts of said at least one rubber, up to about 80 parts by weight of said at least one additional filler.

17. The method of claim 11 wherein said steel reinforcement is in the form of at least one of wire, cable, cord, and filament.

18. The method of claim 11 wherein said silane component is added to said blended composition after the other ingredients have been mixed.

19. The method of claim 11 wherein said steel reinforcement comprises low carbon steel.

20. The method of claim 11 further comprising curing said reinforced composite so as to provide a vulcanized rubber article.

* * * * *